United States Patent
Cermak et al.

(10) Patent No.: US 10,905,141 B2
(45) Date of Patent: Feb. 2, 2021

(54) CONTROLLED ATMOSPHERE SYSTEM AND METHOD FOR CONTROLLING THE SAME

(71) Applicant: THERMO KING CORPORATION, Minneapolis, MN (US)

(72) Inventors: Radim Cermak, Prague (CZ); Jiri Zita, Brno (CZ); Lubos Forejt, Prague (CZ)

(73) Assignee: Thermo King Corporation, Minneapolis, MN (US)

(*) Notice: Subject to any disclaimer, the term of this patent is extended or adjusted under 35 U.S.C. 154(b) by 1090 days.

(21) Appl. No.: 15/317,812

(22) PCT Filed: Jun. 11, 2015

(86) PCT No.: PCT/US2015/035365
§ 371 (c)(1),
(2) Date: Dec. 9, 2016

(87) PCT Pub. No.: WO2015/191876
PCT Pub. Date: Dec. 17, 2015

(65) Prior Publication Data
US 2017/0112171 A1    Apr. 27, 2017

Related U.S. Application Data

(60) Provisional application No. 62/010,638, filed on Jun. 11, 2014.

(51) Int. Cl.
*A23B 4/16*    (2006.01)
*A23L 3/3418*    (2006.01)
(Continued)

(52) U.S. Cl.
CPC .............. *A23L 3/3418* (2013.01); *A23B 4/16* (2013.01); *A23B 7/148* (2013.01); *B01D 53/22* (2013.01);
(Continued)

(58) Field of Classification Search
CPC ......... A23L 3/3418; A23B 4/16; A23B 7/148; B01D 53/22; B01D 2253/10; B01D 2259/455; A23V 2002/00
(Continued)

(56) References Cited

U.S. PATENT DOCUMENTS 4,829,774 A    5/1989  Wassibauer et al.
4,896,514 A    1/1990  Sugiyama et al.
(Continued)

FOREIGN PATENT DOCUMENTS

EP    0294036    12/1988

OTHER PUBLICATIONS

International Search Report and Written Opinion issued in International Search Report No. PCT/US2015/035365 dated Sep. 18, 2015 (9 pages).

*Primary Examiner* — Grant Moubry
*Assistant Examiner* — Ryan L Faulkner
(74) *Attorney, Agent, or Firm* — Hamre, Schumann, Mueller & Larson, P.C.

(57) ABSTRACT

A method for obtaining a desired atmosphere within an interior space during an initial startup phase of a CAS is provided. The method includes a controller starting the CAS while keeping the air compressor OFF. The method also includes the controller calculating an atmosphere change rate while the air compressor OFF, and determining whether the interior space can reach a desired atmosphere set point with the air compressor OFF based on the atmosphere change rate. Further, the method includes the controller maintaining the air compressor OFF until the interior space reaches the desired atmosphere set point when the controller determines that the interior space can reach the desired atmosphere set point with the air compressor OFF, and switching the air compressor ON when the controller deter-
(Continued)

mines that the interior space cannot reach the desired atmosphere set point with the air compressor OFF.

19 Claims, 4 Drawing Sheets

(51) Int. Cl.
  B01D 53/22 (2006.01)
  A23B 7/148 (2006.01)
(52) U.S. Cl.
  CPC ...... *A23V 2002/00* (2013.01); *B01D 2256/10* (2013.01); *B01D 2259/455* (2013.01)
(58) Field of Classification Search
  USPC .................................. 454/173; 700/276, 278
  See application file for complete search history.

(56) References Cited

U.S. PATENT DOCUMENTS

| | | | |
|---|---|---|---|
| 4,961,322 A | 10/1990 | Oguma et al. | |
| 5,244,363 A | 9/1993 | Olson | |
| 5,332,547 A * | 7/1994 | Olson | B01D 53/22 422/112 |
| 5,438,841 A | 8/1995 | Cahill-O'Brien et al. | |
| 5,457,963 A | 10/1995 | Cahill-O'Brien et al. | |
| 5,515,693 A | 5/1996 | Cahill-O'Brien et al. | |
| 5,649,995 A | 7/1997 | Gast, Jr. | |
| 6,460,352 B1 | 10/2002 | Lemcoff et al. | |
| 6,615,908 B1 | 9/2003 | Bosher et al. | |
| 9,121,634 B2 | 9/2015 | Rogers et al. | |
| 2013/0019961 A1 | 1/2013 | Rogers et al. | |

\* cited by examiner

CONTROLLED ATMOSPHERE SYSTEM AND METHOD FOR CONTROLLING THE SAME

FIELD

Embodiments of this disclosure relate generally to a controlled atmosphere system (CAS) and a method for controlling the CAS.

BACKGROUND

A controlled atmosphere system (CAS) is generally used to control an atmospheric parameter such as, but not limited to, a nitrogen ($N_2$) content, an oxygen ($O_2$) content and/or a carbon dioxide ($CO_2$) content within a storage space, for example, within a transport unit. Examples of a transport unit include, but are not limited to, a container on a flat car, an intermodal container, a truck, a boxcar, or other similar transport unit. A transport unit is commonly used to transport perishable cargo such as, but not limited to, produce, frozen foods, and meat products. By controlling one or more atmospheric parameters within the transport unit, the rate of ripening of perishable cargo stored in the transport unit can be reduced.

SUMMARY

Embodiments of this disclosure relate generally to a CAS. More specifically, the embodiments relate to a CAS and a method for controlling the CAS.

In particular, the embodiments described herein provide a system and method for reaching a desired oxygen ($O_2$) concentration and/or a desired carbon dioxide ($CO_2$) concentration within an interior space during an initial startup phase.

An initial startup phase as defined herein refers to the first time the CAS is set to operate after a new cargo is stored in the interior space.

The embodiments described herein allow the CAS to reach desired $O_2$ and/or $CO_2$ set points even when the cargo stored in the interior space has a low respiration rate and/or the leakage rate of $O_2$ within the interior space is high. The embodiments described herein also provide energy savings by efficiently switching a compressor of the CAS to an OFF state when the natural respiration rate of the cargo is sufficient to achieve the desired $O_2$ and/or $CO_2$ concentration within the interior space.

In one embodiment, a method for obtaining a desired atmosphere within an interior space during an initial startup phase of a CAS is provided. The CAS can include an air compressor having an ON state to allow ambient air outside of the interior space into the interior space and an OFF state to prevent ambient air outside of the interior space into the interior space. The method includes a controller starting the CAS while maintaining the air compressor in the OFF state. The method also includes the controller calculating an atmosphere change rate while the air compressor is in the OFF state, and determining whether the interior space can reach a desired atmosphere set point with the air compressor in the OFF state based on the atmosphere change rate. Further, the method includes the controller maintaining the air compressor in the OFF state until the interior space reaches the desired atmosphere set point when the controller determines that the interior space can reach the desired atmosphere set point with the air compressor in the OFF state, and switching the air compressor to the ON state and supplying nitrogen to the interior space at a first nitrogen purity level when the controller determines that the interior space cannot reach the desired atmosphere set point with the air compressor in the OFF state.

In another embodiment, a CAS for controlling an atmosphere within an interior space is provided. The CAS includes an air compressor and a controller. The air compressor is configured to provide ambient air outside of the interior space into the interior space, the air compressor having an ON state to allow ambient air outside of the interior space into the interior space, and an OFF state to prevent ambient air outside of the interior space into the interior space. The controller is configured to: start the CAS with the air compressor in the OFF state; calculate an atmosphere change rate while the air compressor is in the OFF state; determine, based on the atmosphere change rate, whether the interior space can reach a desired atmosphere set point with the air compressor in the OFF state; maintain the air compressor in the OFF state until the interior space reaches the desired atmosphere set point when the controller determines that the interior space can reach the desired atmosphere set point with the air compressor in the OFF state; and switch the air compressor to the ON state and instruct the CAS to supply nitrogen to the interior space at a first nitrogen purity level when the controller determines that the interior space cannot reach the desired atmosphere set point with the air compressor in the OFF state.

BRIEF DESCRIPTION OF THE DRAWINGS

References are made to the accompanying drawings that form a part of this disclosure, and which illustrate the embodiments in which the systems and methods described in this Specification can be practiced.

Like reference numbers represent like parts throughout.

DETAILED DESCRIPTION

Perishable goods, such as fruits and vegetables, can consume oxygen and produce carbon dioxide (e.g. due to a ripening effect of the perishable goods) when being stored or in transportation. The ripening effect can reduce shelf life of the perishable goods. To help prolong the shelf life of the perishable goods, atmosphere in an interior space of, for example, a transport unit can be controlled. During the transportation, the ripening effect of the perishable goods can continuously cause the concentrations of the oxygen and/or carbon dioxide in the storage space to change, which may cause undesirable effects on the shelf life of the perishable goods. It may be desired to control the atmosphere in the storage space during the transportation and/or storage of the perishable goods.

Embodiments of this disclosure relate generally to a CAS and a method for controlling the CAS.

A "controlled atmosphere system" (CAS) includes, for example, a controlled atmosphere circuit for controlling one or more atmospheric parameters within an interior space of a transport unit.

A "transport refrigeration system" (TRS) includes, for example, a refrigeration circuit for controlling the refrigeration of an interior space of a transport unit. The TRS may be a vapor-compressor type refrigeration system, or any other suitable refrigeration system that can use refrigerant, cold plate technology, or the like.

A "transport unit" includes, for example, a container (e.g., a container on a flat car, an intermodal container, etc.), a truck, a box car, or other similar transport unit.

A "CAS controller" includes, for example, an electronic device (e.g., a processor, memory, etc.) that is configured to manage, command, direct, and regulate the behavior of one or more components of a CAS (e.g., an air compressor, one or more flow valves, one or more sensors, one or more switches, etc.). In some embodiments, the CAS controller can be part of a controller configured to manage, command, direct, and regulate the behavior of one or more components of a refrigeration circuit (e.g., an evaporator, a condenser, a compressor, an expansion valve (EXV), an electronic throttling valve (ETV), etc.), one or more components of an power unit powering, for example, the CAS and a refrigeration circuit, etc.

Figure 1:
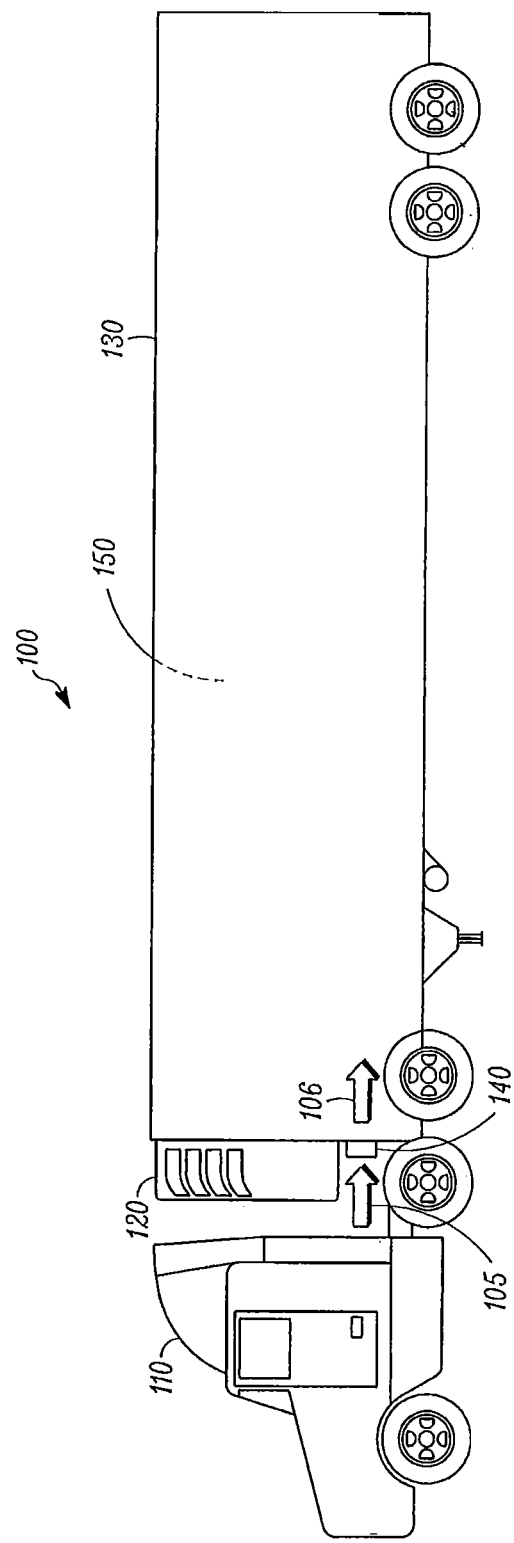
FIG. 1 illustrates a transport unit, with which the embodiments disclosed herein can be practiced.

FIG. 1 illustrates a temperature controlled truck trailer 100 that includes a truck 110 and a trailer 130, with which the embodiments disclosed herein can be practiced. The trailer 130 is equipped with a transport refrigeration unit (TRU) 120 and a CAS 140.

The TRU 120 may be configured to control a temperature in a storage space 150 of a trailer 130. The CAS 140 can be configured to control one or more atmospheric parameters (e.g., oxygen content, carbon dioxide content, and/or nitrogen content) within the storage space 150. In particular, the CAS 140 can be configured to separate nitrogen from, for example, ambient air 105 and the storage space 150. The CAS 140 can also be configured to supply separated nitrogen 106 to the storage space 150. The TRU 120 and the CAS 140 can work together to provide a desired atmospheric condition for perishable goods such as, for example, vegetables and fruits in transport.

It is to be appreciated that the embodiments disclosed herein is not limited to a transport unit such as, for example, a container, a truck, a box car, etc. The embodiments disclosed herein can generally work with a storage space of such as, for example, a refrigeration unit, or a cold room.

Figure 2:
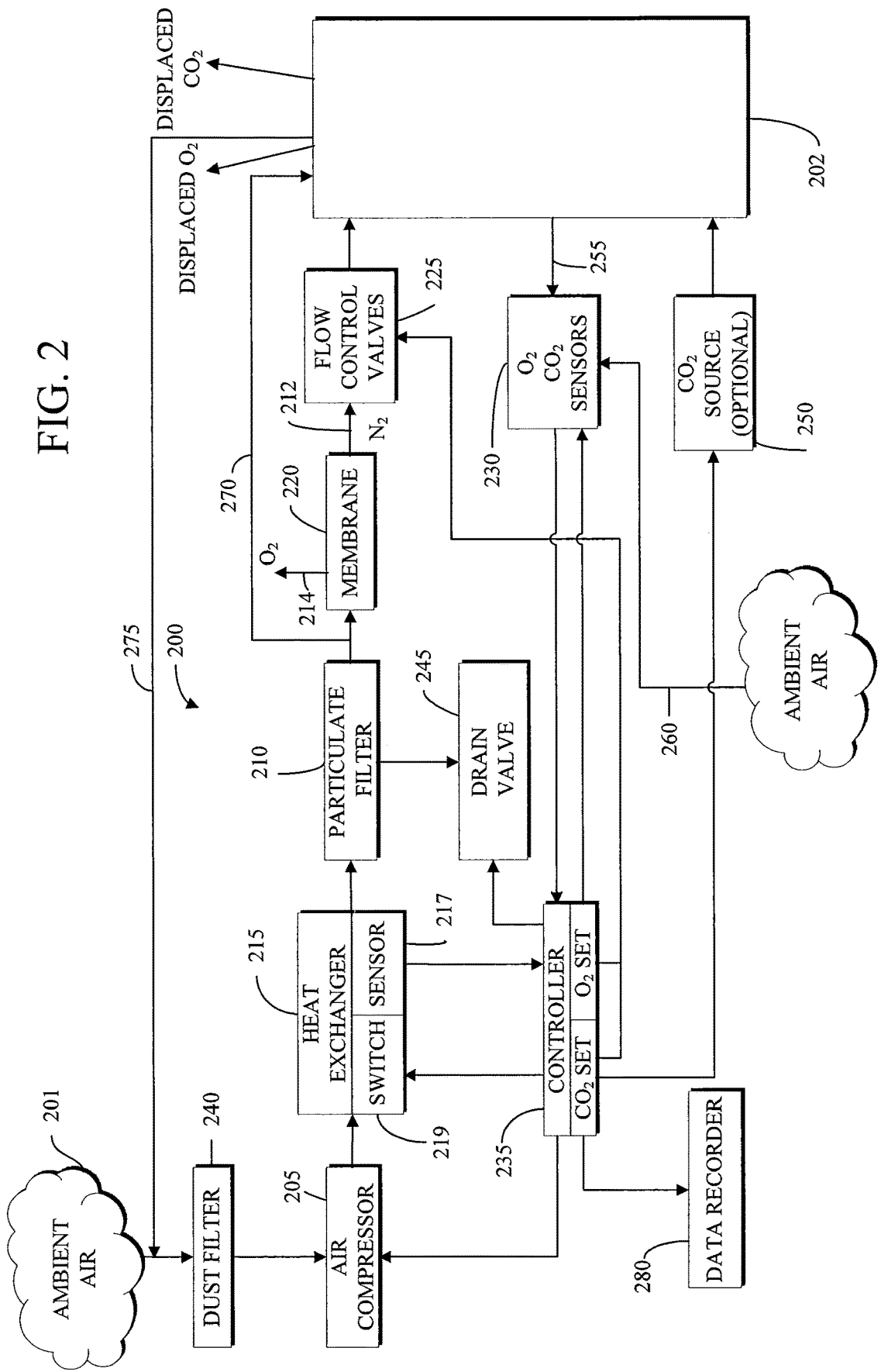
FIG. 2 is a block diagram of a controlled atmosphere system, according to one embodiment.

FIG. 2 illustrates one embodiment of CAS 200 for a transport unit 202, such as the trailer 130 shown in FIG. 1. The basic components of the CAS include an air compressor 205, a particulate filter 210, a heat exchanger 215, a nitrogen separation membrane 220, a system of metering valves 225, a plurality of gas sensors 230 and a CAS controller 235.

The CAS 200 is configured to control the amount of oxygen and carbon dioxide inside the transport unit 202 to change the rate of ripening of cargo (not shown) stored in the transport unit 202. The CAS 200 can control the amount of oxygen ($O_2$) and carbon dioxide ($CO_2$) by introducing nitrogen ($N_2$) generated from the nitrogen separation membrane 220 and/or introducing carbon dioxide ($CO_2$) provided from an optional $CO_2$ source 250.

When the CAS 200 is running, ambient air 201 from outside the transport unit 202 enters the air compressor 205 through a dust filter 240. In some embodiments, air from inside the transport unit 202 can also be directed to the air compressor 205 through the dust filter 240 via an intake line 275. The atmospheric air is then compressed to a high pressure by the air compressor 205. The high pressure air from the air compressor 205 passes to the heat exchanger 215 where it can be temperature conditioned (e.g., heated or cooled) to an optimum operating temperature. The CAS controller 235 receives inputs from a heat exchanger temperature sensor 217 and can control operation of a heat exchanger switch 219 to maintain the temperature of the compressed air leaving the heat exchanger 215.

The temperature conditioned, high pressure air is then filtered by the particulate filter 210 to remove, for example, one or more of moisture, dirt, oil, ozone, hydrocarbons, etc. before passing to the heat exchanger 215. A drain valve 245 is provided for the particulate filter 210. The drain valve 245 can be a normally closed drain valve adapted to be opened when instructed by the CAS controller 235 or a normally open drain valve adapted to be closed when instructed by the CAS controller 235. The CAS controller 235 can be programmed to periodically open the drain value 245, for a short time, to remove residue which may build up in the particulate filter 210. It will be appreciated that in some embodiments the particulate filter 210 can include a single filter and in other embodiments the particulate filter 210 can include two or more filters. It will also be appreciated that in some embodiments the drain valve 245 can be an auto-drain valve that can open and close automatically without instruction from the CAS controller 235.

The temperature conditioned, high pressure air passing from the particulate filter 210 enters the nitrogen separation membrane 220, where it can be separated into high purity nitrogen, which passes from a nitrogen outlet 212, and oxygen/and other gases which are passed to an oxygen outlet 214. The rate of separation occurring in the nitrogen separation membrane 220 depends on the flow of air through the nitrogen separation membrane 220. This flow rate is controlled by the pressure in the nitrogen outlet 212. The higher the pressure in the nitrogen outlet 212, the higher the nitrogen purity generated, and the lower the flow rate of nitrogen. The nitrogen separation membrane 220 can be capable of generating nitrogen purity levels greater than, for example, about 99 percent. As the pressure in the nitrogen outlet 212 falls, the purity level of the nitrogen falls, and the flow rate increases.

The nitrogen enriched gas passing from the nitrogen separation membrane 220 through the nitrogen outlet 212 passes to the flow control valves 225. The oxygen/other gasses from the oxygen outlet 214 are exhausted to the outside air.

The pressure on the nitrogen outlet 212 of the nitrogen separation membrane 220 is regulated by the aforementioned flow control valves 225. To control the percentage of nitrogen present in the transport unit 202, the CAS controller 235 can be programmed to cycle the flow control valves 225 to increase or decrease the amount/purity of nitrogen in the transport unit 202 as required. The CAS controller 235 may also add $CO_2$ from an external $CO_2$ source 250 if desired.

In some embodiments (e.g., during a ventilation mode), the temperature conditioned, high pressure air passing from the heat exchanger 215 can bypass the nitrogen separation membrane 220 and pass directly to the transport unit 202 via a bypass line 270. Accordingly, the amount of oxygen in the transport unit 202 can be increased and the amount of carbon dioxide in the transport unit 202 can be decreased.

The gas sensors 230 can include, for example, an oxygen concentration sensor, a carbon dioxide concentration sensor, an ethylene concentration sensor, etc. Periodic calibration of the gas sensors 230 to correct drifts with time and temperature can require sampling outside air via a line 260. The gas sensors 230 can be provided at various locations within the transport unit 202.

The CAS controller 235 is configured to monitor the amount of oxygen and carbon dioxide in the transport unit 202, using the gas sensors 230 via a sample line 255. The oxygen and carbon dioxide concentrations monitored by the CAS controller 235 can be stored in a data recorder 280.

Figure 3A:
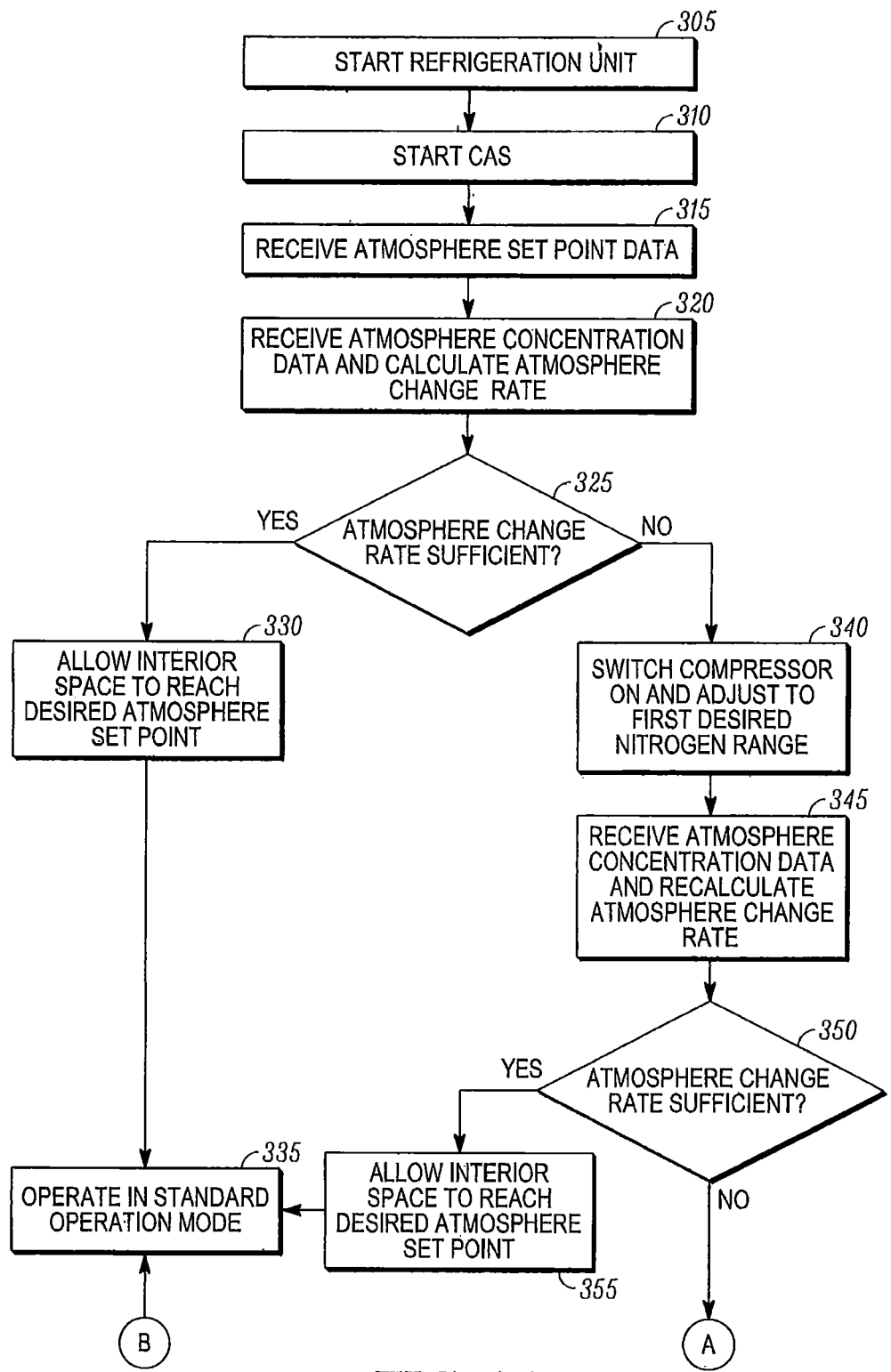
FIGS. 3A and 3B illustrate a flow chart of a method for controlling a controlled atmosphere system, according to one embodiment.
Figure 3B:
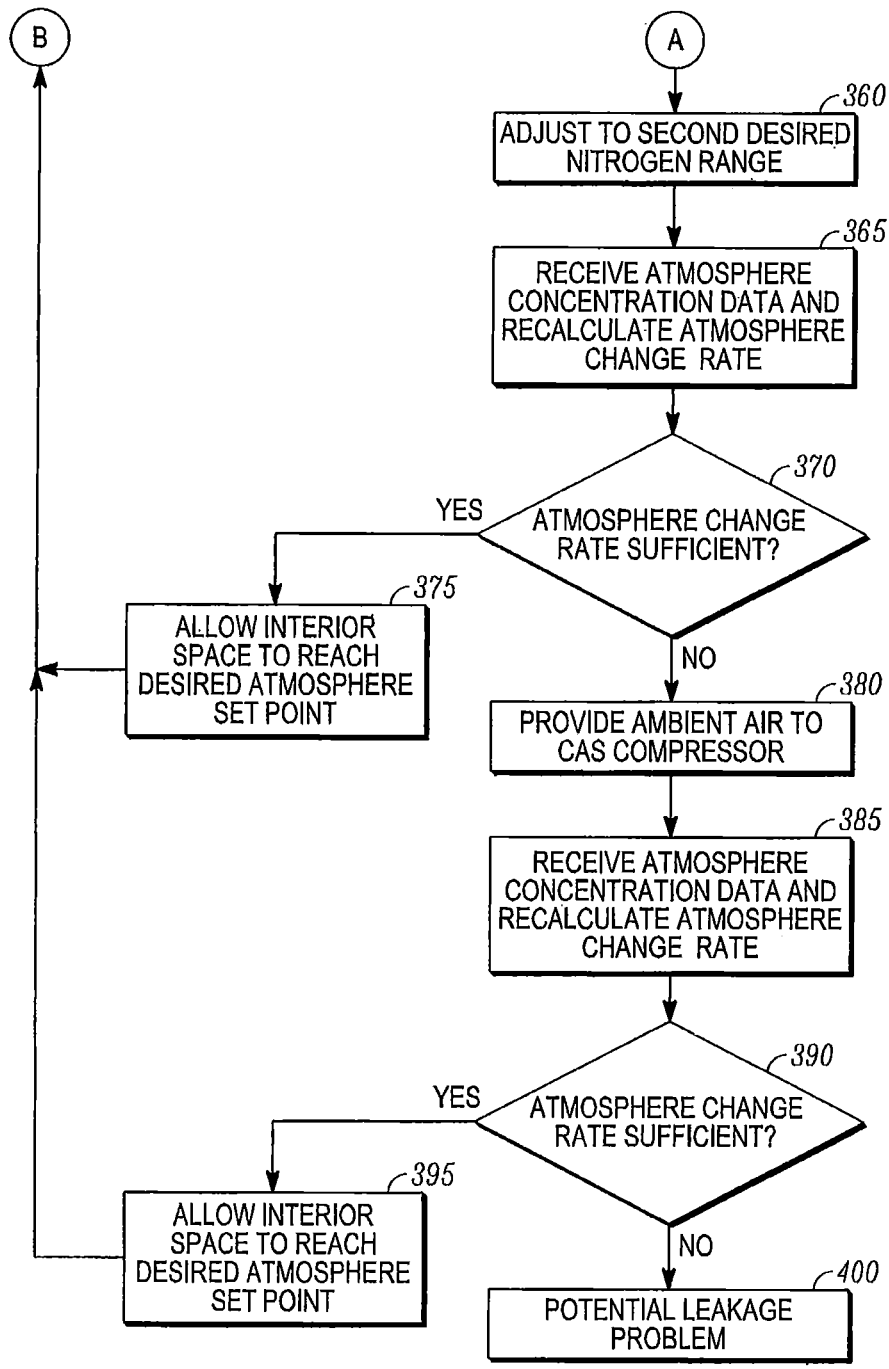

FIGS. 3A and 3B illustrate a flowchart of a process 300 for controlling a CAS (e.g., the CAS 200 shown in FIG. 2) of a storage space (e.g., the storage space 150 shown in FIG. 1), according to one embodiment. In particular, the process 300 controls an initial startup phase of the CAS. At 305, a controller starts a refrigeration unit of the storage space. The storage space can be part of for example, a transport unit (e.g., the transport unit 202 shown in FIG. 2), a refrigeration unit, a cold, room, etc. In some embodiments, the controller can be a CAS controller (e.g., the controller 235 shown in FIG. 2). In other embodiments, the controller can be a controller of the refrigeration unit. When the controller determines that the refrigeration unit is ready for operation, the process 300 proceeds to 310.

At 310, a controller starts the CAS but keeps a compressor of the CAS (e.g., the air compressor 205) in an OFF state (e.g., the CAS compressor is not in operation). In some embodiments, when the controller starts the CAS, the CAS undergoes a pre-trip inspection whereby components of the CAS (e.g., a sensor(s), a CAS compressor, etc.) are checked to ensure that they are operating properly. In some embodiments, the controller is a CAS controller (e.g., the controller 235 shown in FIG. 2). In some embodiments, the controller used to start and control the CAS can be the controller used to start and control the refrigeration unit. At 315, the controller receives desired atmosphere set point data for controlling an atmosphere within the storage space. The desired atmosphere set point data can include, for example, an oxygen and/or carbon dioxide set point(s) within the storage space.

At 320, while the CAS compressor remains in the OFF state, the CAS controller receives atmosphere concentration data within the storage space from one or more gas sensors of the CAS (e.g., the gas sensors 230 shown in FIG. 2) and calculates an atmosphere change rate over a time period T. The atmosphere concentration data can include, for example, an oxygen and/or carbon dioxide concentration within the storage space. The atmosphere change rate can include, for example, an oxygen decay rate and/or a carbon dioxide increase rate. The time period T is an amount that is sufficient to determine whether the atmosphere change rate is sufficient to reach the desired atmosphere set point(s) received by the CAS controller. The time period T necessary to determine whether the desired atmosphere set point(s) can be reached without the CAS compressor in an ON state can vary based on the desired atmosphere set point data received by the CAS controller. In some embodiments, the time period T can be about one hour. The process 300 then proceeds to 325.

At 325, the CAS controller determines whether the calculated atmosphere change rate is sufficient to reach the desired atmosphere set point(s) obtained via the atmosphere set point data. If the CAS controller determines that the calculated atmosphere change rate is sufficient to reach the desired atmosphere set point(s), the process 300 proceeds to 330. If the CAS controller determines that the calculated atmosphere change rate is not sufficient to reach the desired atmosphere set point(s), the process 300 proceeds to 340.

At 330, the CAS compressor will remain in the OFF state until the CAS controller determines (using the data received from the gas sensors) that the atmosphere concentration within the storage space has reached the desired atmosphere set point(s) within the storage space.

Accordingly, the CAS can provide energy savings by keeping the CAS compressor in an OFF state while still ensuring that the storage space reaches the desired atmosphere set point(s). The process 300 then proceeds to 335.

At 335, the initial startup phase has completed and the CAS controller operates the CAS in a standard operation mode. The process 300 ends.

At 340, the CAS controller switches the CAS compressor to the ON state and provides nitrogen purity modification within the storage space. In some embodiments, the CAS compressor receives ambient air outside of the storage space and the CAS controller adjusts the amount/purity of nitrogen introduced within the storage space by controlling one or more flow control valves downstream of the nitrogen separation membrane (e.g., the flow control valves 225 shown in FIG. 2) to reach a first desired nitrogen purity range within the storage space. In some embodiments, the first desired nitrogen purity range can be between about 90% to about 95%. It is appreciated that nitrogen purity modification can be provided without controlling one or more flow control valves. For example, in some embodiments the CAS controller can also provide nitrogen purity modification by adjusting, for example, a speed of the CAS compressor. The process 300 then proceeds to 345.

At 345, once the nitrogen purity level is adjusted to achieve the desired nitrogen purity range within the storage space at 340, the CAS controller receives atmosphere concentration data within the storage space from the one or more gas sensors of the CAS and recalculates the atmosphere change rate over the time period T.

At 350, the CAS controller determines whether the recalculated atmosphere change rate is sufficient to reach the desired atmosphere set point(s). If the CAS controller determines that the recalculated atmosphere change rate is sufficient to reach the desired atmosphere set point(s), the process 300 proceeds to 355. If the CAS controller determines that the recalculated atmosphere change rate is not sufficient to reach the desired atmosphere set point(s), the process 300 proceeds to A, as shown in FIG. 3A.

At 355, the CAS controller keeps the CAS compressor in the ON state and maintains the nitrogen purity level within the first desired nitrogen purity range set at 340 to reach the desired atmosphere set point(s) within the storage space. Once the CAS controller determines (using the data received from the gas sensors) that the atmosphere concentration within the storage space has reached the desired atmosphere set point(s) within the storage space, the process 300 proceeds to 335.

As shown in FIG. 3B, from A the process 300 proceeds to 360. At 360, the CAS controller controls the one or more flow control valves downstream of the nitrogen separation membrane to reach a second desired nitrogen purity range. In some embodiments, the second desired nitrogen purity range can be between about 95% to about 99.9%. The process 300 then proceeds to 365.

At 365, once the nitrogen purity level is adjusted to achieve the second desired nitrogen purity range within the storage space at 360, the CAS controller receives atmosphere concentration data within the storage space from the one or more gas sensors of the CAS and recalculates the atmosphere change rate over the time period T.

At 370, the CAS controller determines whether the recalculated atmosphere change rate is sufficient to reach the desired atmosphere set point(s). If the CAS controller determines that the recalculated atmosphere change rate is sufficient to reach the desired atmosphere set point(s), the process 300 proceeds to 375. If the CAS controller determines that the recalculated atmosphere change rate is not sufficient to reach the desired atmosphere set point(s), the process 300 proceeds to 380.

At 375, the CAS controller keeps the CAS compressor in the ON state and maintains the nitrogen purity level within the second desired nitrogen purity range set at 360 to reach the desired atmosphere set point(s) within the storage space. Once the CAS controller determines (using the data received from the gas sensors) that the atmosphere concentration within the storage space has reached the desired atmosphere set point(s) within the storage space, the process 300 proceeds to B as shown in FIG. 3B. As shown in FIG. 3A, from B the process 300 proceeds to 335.

At 380, the CAS controller readjusts the atmosphere change rate by allowing the CAS compressor to receive air from the ambient air outside the storage space and/or receive air from within the storage space (e.g., via an intake line 275). The process 300 then proceeds to 385.

At 385, the CAS controller receives atmosphere concentration data within the storage space from the one or more gas sensors of the CAS and recalculates the atmosphere change rate over the time period T.

At 390, the CAS controller determines whether the recalculated atmosphere change rate is sufficient to reach the desired atmosphere set point(s). If the CAS controller determines that the recalculated atmosphere change rate is sufficient to reach the desired atmosphere set point(s), the process 300 proceeds to 395. If the CAS controller determines that the recalculated atmosphere change rate is not sufficient to reach the desired atmosphere set point(s), the process 300 proceeds to 400.

At 395, the CAS controller maintains the adjustments made at 380 to reach the desired atmosphere set point(s) within the storage space. Once the CAS controller determines (using the data received from the gas sensors) that the atmosphere concentration within the storage space has reached the desired atmosphere set point(s) within the storage space, the process 300 proceeds to B as shown in FIG. 3B. As shown in FIG. 3A, from B the process 300 proceeds to 335.

At 400, the CAS controller determines that the storage space may have a leakage problem that prevents the storage space from achieving the desired atmosphere set point(s) or that it is not possible to reach the desired atmosphere set point(s). In some embodiments, the CAS controller can then issue a service alert to check for leakage issues. Also, in some embodiments, if the CAS controller determines that the atmosphere change rate calculated at 385 is slower than the atmosphere change rate calculated at 365, the CAS controller can control the one or more flow control valves downstream of the nitrogen separation membrane to reach the second desired nitrogen purity range and prevent air intake into the CAS compressor from within the storage space. Further, in some embodiments, if the CAS controller determines that the atmosphere change rate calculated at 365 is slower than the atmosphere change rate calculated at 345, the CAS controller can control the one or more flow control valves downstream of the nitrogen separation membrane to reach the first desired nitrogen purity range. In some embodiments, when the CAS controller determines that it is not possible to reach the desired atmosphere set point(s), the CAS controller can adjust the desired atmosphere set point (s) to a level close to the desired atmosphere set point(s) that can be reached.

ASPECTS

It is noted that any of aspects 1-10 below can be combined with any of aspects 11-20.

Aspect 1. A method for obtaining a desired atmosphere within an interior space during an initial startup phase of a controlled atmosphere system (CAS), the CAS including an air compressor having an ON state to allow ambient air outside of the interior space into the interior space and an OFF state to prevent ambient air outside of the interior space into the interior space, the method comprising:

a controller starting the CAS while maintaining the air compressor in the OFF state;

the controller calculating an atmosphere change rate while the air compressor is in the OFF state;

the controller determining whether the interior space can reach a desired atmosphere set point with the air compressor in the OFF state based on the atmosphere change rate;

the controller maintaining the air compressor in the OFF state until the interior space reaches the desired atmosphere set point when the controller determines that the interior space can reach the desired atmosphere set point with the air compressor in the OFF state; and the controller switching the air compressor to the ON state and supplying nitrogen at a first nitrogen purity level to the interior space when the controller determines that the interior space cannot reach the desired atmosphere set point with the air compressor in the OFF state.

Aspect 2. The method of aspect 1, further comprising a controller starting a refrigeration unit of the interior space prior to the controller starting the CAS while maintaining the air compressor of the CAS in the OFF state.

Aspect 3. The method of any of aspects 1-2, further comprising:

the controller receiving atmosphere concentration data from within the interior space while the air compressor is in the OFF state; and the controller calculating the atmosphere change rate while the air compressor is in the OFF state based on the atmosphere concentration data.

Aspect 4. The method of any of aspects 1-3, wherein the desired atmosphere set point is at least one of an oxygen set point and a carbon dioxide set point, and the atmosphere concentration data is at least one of an oxygen concentration and a carbon dioxide concentration within the interior space.

Aspect 5. The method of any of aspects 1-4, further comprising:

the controller determining whether switching the air compressor to the ON state and supplying the nitrogen at the first nitrogen purity level is sufficient to reach the atmosphere set point data within the interior space; and the controller modifying an air flow and adjusting the supply of nitrogen from the first nitrogen purity level to a second nitrogen purity level to the interior space when the air compressor is in the ON state and the controller determines that switching the air compressor to the ON state and supplying nitrogen at the first nitrogen purity level is not sufficient for the interior space to reach the atmosphere set point data.

Aspect 6. The method of aspect 5, wherein the first nitrogen purity level is a nonzero nitrogen purity level and is lower than the second nitrogen purity level.

Aspect 7. The method of aspect 5, further comprising the controller determining the second nitrogen purity level based on the desired atmosphere set point.

Aspect 8. The method of any of aspects 1-7, wherein the atmosphere change rate is at least one of an oxygen decay rate and a carbon dioxide increase rate.

Aspect 9. The method of any of aspects 1-8, further comprising the controller receiving the desired atmosphere set point after starting the CAS while maintaining the air compressor of the CAS in the OFF state.

Aspect 10. The method of any of aspects 1-9, wherein the atmosphere change rate is at least one of an oxygen decay rate and a carbon dioxide increase rate.

Aspect 11. A controlled atmosphere system (CAS) for controlling an atmosphere within an interior space, the CAS comprising:
  an air compressor configured to provide ambient air outside of the interior space into the interior space, the air compressor having an ON state to allow ambient air outside of the interior space into the interior space, and an OFF state to prevent ambient air outside of the interior space into the interior space; and
  a controller configured to:
    start the CAS with the air compressor in the OFF state,
    calculate an atmosphere change rate while the air compressor is in the OFF state,
    determine, based on the atmosphere change rate, whether the interior space can reach a desired atmosphere set point with the air compressor in the OFF state,
    maintain the air compressor in the OFF state until the interior space reaches the desired atmosphere set point when the controller determines that the interior space can reach the desired atmosphere set point with the air compressor in the OFF state, and
    switch the air compressor to the ON state and instruct the CAS to supply nitrogen to the interior space at a first nitrogen purity level when the controller determines that the interior space cannot reach the desired atmosphere set point with the air compressor in the OFF state.

Aspect 12. The CAS of aspect 11, wherein the controller is configured to start a refrigeration unit of the interior space prior to the controller starting the CAS while maintaining the air compressor of the CAS in the OFF state.

Aspect 13. The CAS of any of aspects 11-12, wherein the controller is configured to:
  receive atmosphere concentration data from within the interior space while the air compressor is in the OFF state; and
  calculate the atmosphere change rate while the air compressor is in the OFF state based on the atmosphere concentration data.

Aspect 14. The CAS of any of aspects 11-13, wherein the desired atmosphere set point is at least one of an oxygen set point and a carbon dioxide set point, and
  the atmosphere concentration data is at least one of an oxygen concentration and a carbon dioxide concentration within the interior space.

Aspect 15. The CAS of any of aspects 11-14, wherein the controller is configured to:
  determine whether switching the air compressor to the ON state and supplying the nitrogen at the first nitrogen purity level to the interior space is sufficient to reach the atmosphere set point data within the interior space; and
  modify an air flow and adjust the supply of nitrogen to the interior space from the first nitrogen purity level to a second nitrogen purity level when the air compressor is in the ON state and the controller determines that switching the air compressor to the ON state and supplying nitrogen to the interior space at the first nitrogen purity level is not sufficient for the interior space to reach the atmosphere set point data.

Aspect 16. The CAS of aspect 15, further comprising a nitrogen separation membrane connected to the air compressor and configured to supply nitrogen with the ambient air directed into the interior space by the air compressor,
  wherein the first nitrogen purity level is a nonzero nitrogen purity level and is lower than the second nitrogen purity level.

Aspect 17. The CAS of aspect 15, wherein the controller is configured to determine the second nitrogen purity level supplied by the nitrogen separation membrane into the interior space based on the desired atmosphere set point.

Aspect 18. The CAS of any of aspects 11-17, wherein the atmosphere change rate is at least one of an oxygen decay rate and a carbon dioxide increase rate.

Aspect 19. The CAS of any of aspects 11-18, wherein the controller is configured to receive the desired atmosphere set point after starting the CAS while maintaining the air compressor of the CAS in the OFF state.

Aspect 20. The CAS of any of aspects 11-19, wherein the atmosphere change rate is at least one of an oxygen decay rate and a carbon dioxide increase rate.

The terminology used in this Specification is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. The word "embodiment" as used within this Specification may, but does not necessarily, refer to the same embodiment. This Specification and the embodiments described are exemplary only. Other and further embodiments may be devised without departing from the basic scope thereof, with the true scope and spirit of the disclosure being indicated by the claims that follow.

The invention claimed is:

1. A method for obtaining a desired atmosphere within an interior space during an initial startup phase of a controlled atmosphere system (CAS), the CAS including an air compressor having an ON state to allow ambient air outside of the interior space into the interior space and an OFF state to prevent ambient air outside of the interior space into the interior space, the method comprising:
  a controller starting the CAS while maintaining the air compressor in the OFF state;
  the controller calculating an atmosphere change rate while the air compressor is in the OFF state;
  the controller determining whether the interior space can reach a desired atmosphere set point with the air compressor in the OFF state based on the atmosphere change rate;
  the controller maintaining the air compressor in the OFF state until the interior space reaches the desired atmosphere set point when the controller determines that the interior space can reach the desired atmosphere set point with the air compressor in the OFF state; and
  the controller switching the air compressor to the ON state to discharge pressurized air, and supplying nitrogen enriched air at a first nitrogen purity level to the interior space when the controller determines that the interior space cannot reach the desired atmosphere set point with the air compressor in the OFF state, wherein supplying nitrogen enriched air at a first nitrogen purity level to the interior space includes separating the pressurized air to produce the nitrogen enriched air.

2. The method of claim 1, further comprising the controller starting a refrigeration unit for the interior space prior to the controller starting the CAS while maintaining the air compressor of the CAS in the OFF state.

3. The method of claim 1, further comprising:
the controller receiving atmosphere concentration data from within the interior space while the air compressor is in the OFF state; and
the controller calculating the atmosphere change rate while the air compressor is in the OFF state based on the atmosphere concentration data.

4. The method of claim 1, wherein the desired atmosphere set point is at least one of an oxygen set point and a carbon dioxide set point, and
the atmosphere concentration data is at least one of an oxygen concentration and a carbon dioxide concentration within the interior space.

5. The method of claim 1, further comprising:
the controller determining whether switching the air compressor to the ON state and supplying the nitrogen enriched air at the first nitrogen purity level is sufficient to reach the atmosphere set point data within the interior space; and
the controller modifying an air flow so as to adjust the nitrogen enriched air supplied to the interior space from the first nitrogen purity level to a second nitrogen purity level when the air compressor is in the ON state and the controller determines that switching the air compressor to the ON state and supplying the nitrogen enriched air at the first nitrogen purity level is not sufficient for the interior space to reach the atmosphere set point data.

6. The method of claim 5, wherein the first nitrogen purity level is less than the second nitrogen purity level.

7. The method of claim 5, further comprising the controller determining the second nitrogen purity level based on the desired atmosphere set point.

8. The method of claim 1, wherein the atmosphere change rate is at least one of an oxygen decay rate and a carbon dioxide increase rate.

9. The method of claim 1, further comprising the controller receiving the desired atmosphere set point after starting the CAS while maintaining the air compressor of the CAS in the OFF state.

10. The method of claim 1, wherein the pressurized air discharged by the compressor includes gas from the interior space.

11. A controlled atmosphere system (CAS) for controlling an atmosphere within an interior space, the CAS comprising:
an air compressor configured to provide ambient air outside of the interior space into the interior space, the air compressor having an ON state to allow ambient air outside of the interior space into the interior space, and an OFF state to prevent ambient air outside of the interior space into the interior space; and
a controller configured to:
start the CAS with the air compressor in the OFF state,
calculate an atmosphere change rate while the air compressor is in the OFF state,
determine, based on the atmosphere change rate, whether the interior space can reach a desired atmosphere set point with the air compressor in the OFF state,
maintain the air compressor in the OFF state until the interior space reaches the desired atmosphere set point when the controller determines that the interior space can reach the desired atmosphere set point with the air compressor in the OFF state, and
switch the air compressor to the ON state to discharge pressurized air and instruct the CAS to supply nitrogen enriched air to the interior space at a first nitrogen purity level when the controller determines that the interior space cannot reach the desired atmosphere set point with the air compressor in the OFF state, wherein the pressurized air is separated to produce the nitrogen enriched air that is supplied to the interior space.

12. The CAS of claim 11, wherein the controller is configured to start a refrigeration unit of the interior space prior to the controller starting the CAS while maintaining the air compressor of the CAS in the OFF state.

13. The CAS of claim 11, wherein the controller is configured to: receive atmosphere concentration data from within the interior space while the air compressor is in the OFF state; and
calculate the atmosphere change rate while the air compressor is in the OFF state based on the atmosphere concentration data.

14. The CAS of claim 11, wherein the desired atmosphere set point is at least one of an oxygen set point and a carbon dioxide set point, and
the atmosphere concentration data is at least one of an oxygen concentration and a carbon dioxide concentration within the interior space.

15. The CAS of claim 11, wherein the controller is configured to:
determine whether switching the air compressor to the ON state and supplying the nitrogen enriched air at the first nitrogen purity level to the interior space is sufficient to reach the atmosphere set point data within the interior space; and
modify an air flow to adjust the nitrogen enriched air supplied to the interior space from having the first nitrogen purity level to having a second nitrogen purity level when the air compressor is in the ON state and the controller determines that switching the air compressor to the ON state and supplying the nitrogen enriched air to the interior space at the first nitrogen purity level is not sufficient for the interior space to reach the atmosphere set point data.

16. The CAS of claim 15, further comprising a nitrogen separation membrane connected to the air compressor and configured to separate the pressurized air discharged by the compressor to produce the nitrogen enriched air that is supplied to the interior space,
wherein the first nitrogen purity level is less than the second nitrogen purity level.

17. The CAS of claim 15, wherein the controller is configured to determine the second nitrogen purity level supplied by the nitrogen separation membrane to the interior space based on the desired atmosphere set point.

18. The CAS of claim 11, wherein the atmosphere change rate is at least one of an oxygen decay rate and a carbon dioxide increase rate.

19. The CAS of claim 11, wherein the controller is configured to receive the desired atmosphere set point after starting the CAS while maintaining the air compressor of the CAS in the OFF state.

* * * * *